United States Patent
Kasperski

(10) Patent No.: US 8,133,019 B2
(45) Date of Patent: Mar. 13, 2012

(54) DISCRETE LOAD FINS FOR INDIVIDUAL STATOR VANES

(75) Inventor: Donald Joseph Kasperski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 573 days.

(21) Appl. No.: 12/356,786

(22) Filed: Jan. 21, 2009

(65) Prior Publication Data

US 2010/0183436 A1    Jul. 22, 2010

(51) Int. Cl.
*F03B 1/00* (2006.01)
(52) U.S. Cl. ..................... 415/209.3; 415/189
(58) Field of Classification Search ............... 415/209.3, 415/209.4, 189, 190; 416/219 R, 248, 220 R
See application file for complete search history.

(56) References Cited

U.S. PATENT DOCUMENTS

2009/0053056 A1* 2/2009 Finneran et al. ........... 415/209.3

* cited by examiner

*Primary Examiner* — Ross Gushi
(74) *Attorney, Agent, or Firm* — Cantor Colburn LLP

(57) ABSTRACT

An exemplary embodiment of the invention is directed to a turbine engine having a circumferential casing with a circumferentially extending slot formed in an inner wall. A radially inwardly facing fin-ring is disposed in the slot and has a radially inwardly projecting fin extending axially there across. A radially inwardly extending stator blade has a base and an airfoil. The base is disposed in the casing slot, radially inwardly of the fin-ring. A complementary base slot is disposed in the stator blade base and is configured to receive the fin therein for the transfer of a circumferential force, applied to the stator blade, to the fin-ring.

11 Claims, 5 Drawing Sheets

DISCRETE LOAD FINS FOR INDIVIDUAL STATOR VANES

BACKGROUND OF THE INVENTION

The subject matter disclosed herein relates to gas turbine engines and, more particularly, to compressor load management therein.

In a gas turbine engine, air is pressurized in a multistage axial compressor and mixed with fuel in a combustor for generating hot combustion gas that flows downstream through one or more turbine stages for extraction of energy from the gas.

A multistage axial compressor will typically include a series of stationary nozzle assemblies composed of individual compressor stator blades that are supported in mounting slots in the compressor housing. The nozzle assemblies receive air, either ambient at the compressor inlet or compressed air from an upstream compressor stage, and direct it to rotating compressor rotor blades that compress the air for eventual delivery to the combustor, as well as to the turbine for cooling and sealing purposes.

The compressor stator blades may comprise an airfoil and a base, having features that allow the base to be mounted within the housing slots. The compressor housing, being typically defined by two 180-degree segments that assemble to complete the 360-degree housing, receives each stator blade base in the machined slot to thereby define the stationary nozzle assembly. The stator base members may reside in relatively unrestrained end-to-end abutment with one another such that, as air enters and passes through the nozzle assembly, the force of the airflow over the airfoils causes a tangential load on each of the stator bases in a circumferential direction. As a result, the series of stator blades and associated stator blade bases experience a compressive force in a circumferential direction about the 180 degree housing segments resulting in significant compressive force being applied to the stator bases located at the 9 o'clock and 3 o'clock positions within the housing segments. These components recognize the highest compressive loads and, thus, the highest damping versus the stators and associated bases that are positioned 180 degrees away that experience minimal loading and damping. The result of this configuration may be a high degree of vibrational activity from the lightly loaded stator vanes resulting in lower than desirable compressor durability.

It is desirable to provide an axial compressor having a low degree of vibrational activity across the entire nozzle assembly and a consistent force loading of the stator blades thereof.

BRIEF DESCRIPTION OF THE INVENTION

According to one aspect of the invention, a turbine engine comprises a circumferential casing having a circumferentially extending slot formed in an inner wall. A radially inwardly facing fin-ring is disposed in the slot and has a radially inwardly projecting fin extending axially there across. A radially inwardly extending stator blade has a base and an airfoil. The base is disposed in the casing slot, radially inwardly of the fin-ring. A complementary base slot is disposed in the stator blade base and is configured to receive the fin therein for the transfer of a circumferential force, applied to the stator blade, to the fin-ring.

According to another aspect of the invention, a turbine engine comprises a multistage axial compressor having a circumferential casing with a circumferentially extending slot formed in an inner wall thereof. A radially inwardly facing fin-ring is disposed in the slot and has a plurality of radially inwardly extending fins extending axially thereacross in a spaced relationship. A stationary nozzle assembly includes a plurality of radially inwardly extending stator blades. Each blade has an airfoil and a base, with a base slot disposed therein. The stator blade bases are disposed in the circumferentially extending slot with the base slots receiving the radially inwardly extending fins of the fin-ring for the transfer of a circumferential force, applied to the stator blades, to the fin-ring.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

Figure 1:
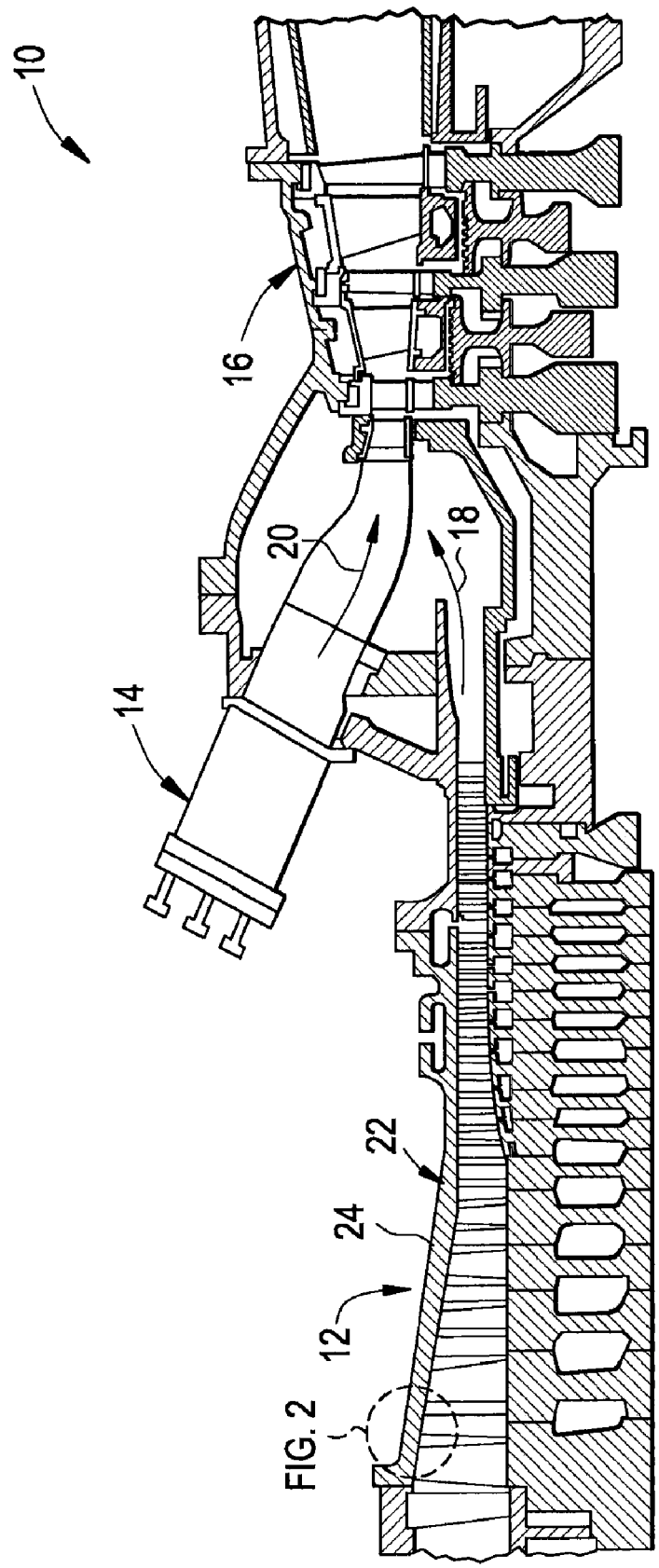
FIG. 1 is an axial sectional view through a portion of an exemplary gas turbine engine in accordance with an embodiment of the present invention.

Illustrated in FIG. 1 is a portion of an exemplary gas turbine engine 10. The engine is axisymmetrical about a longitudinal or axial centerline axis and includes, in serial flow communication, a multistage axial compressor 12, a combustor 14, and a multi-stage turbine 16. During operation, compressed air 18 from the compressor 12 flows to the combustor 14 that operates to combust fuel with the compressed air for generating hot combustion gas 20. The hot combustion gas 20 flows downstream through the multi-stage turbine 16, which extracts energy therefrom.

Figure 2:
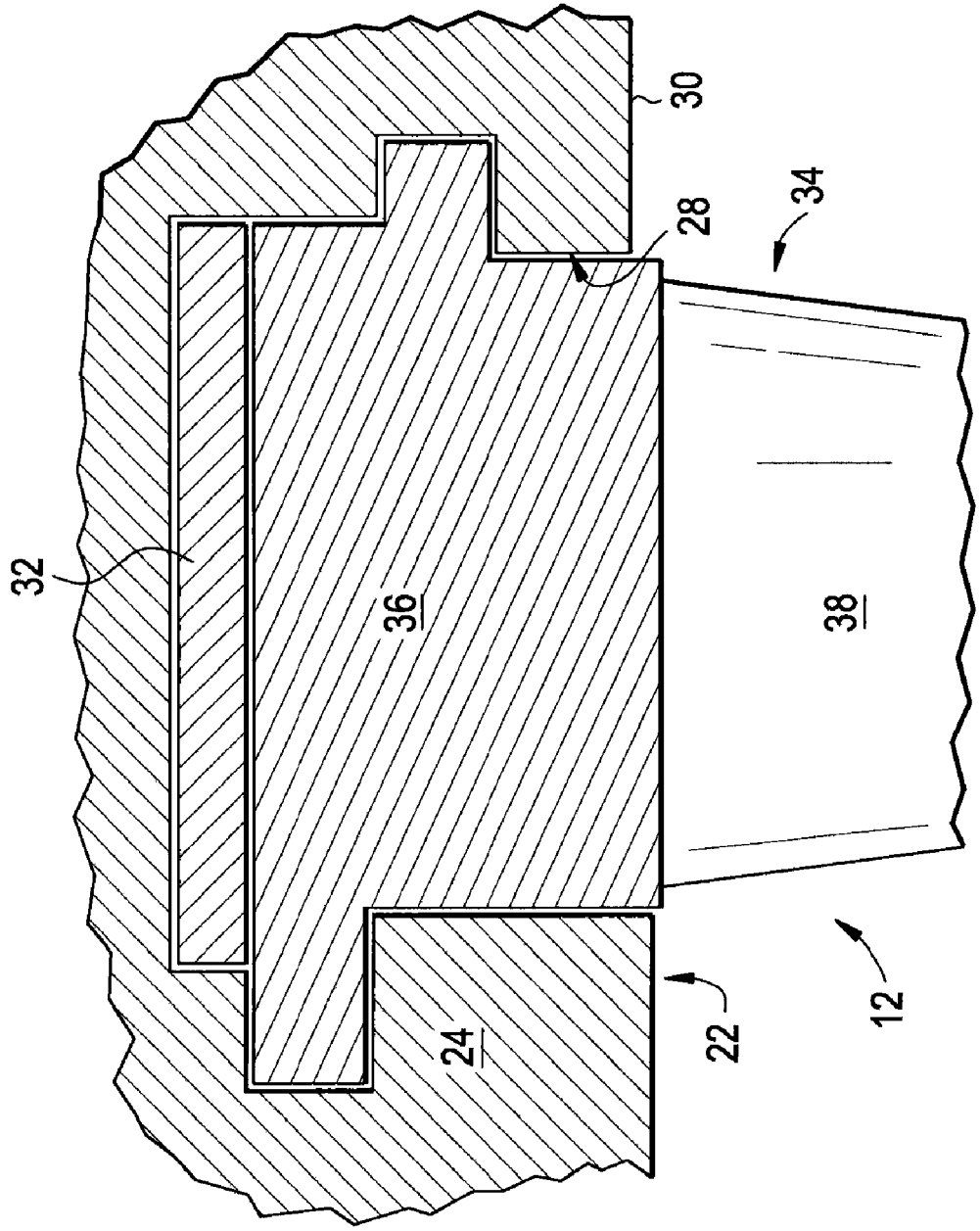
FIG. 2 is a circumferential cross-section taken through a stationary nozzle assembly of the gas turbine engine compressor of FIG. 1.

The compressor 12 includes a circumferential casing 22 which may be constructed of an upper shell 24 and a lower shell (not shown). In industrial, or land based gas turbine applications it is common for the shell 24 to comprise 180 degrees of the 360 degree circumference of the casing 22; other suitable casing configurations may also be selected. Casing slots 28, which are formed, by machining or otherwise, reside in the inner wall 30 of the casing 22, FIG. 2. The casing slots are configured to receive radially inwardly facing fin-ring segments 32, FIGS. 2 and 3, which when loaded into the casing slots will define a fin-ring 33 extending the circumference of a casing slot 28. A series of stator blades 34 each includes a base member 36 and an airfoil 38 extending outwardly therefrom. The base members are configured such that their cross-sections are complementary to a portion of the casing slots 28. The casing slots receive the base members 36 of the stator blades 34 radially inwardly of the fin-ring segments 32 such that the airfoils 38 project radially inwardly towards the centerline of the circumferential casing 22. When loaded into the casing slots 28 in end-to-end relationship, the stator blades 34 will define a stationary vane nozzle assembly 42 about the inner circumference of the circumferential casing 22 of the multistage compressor 12.

Figure 3:
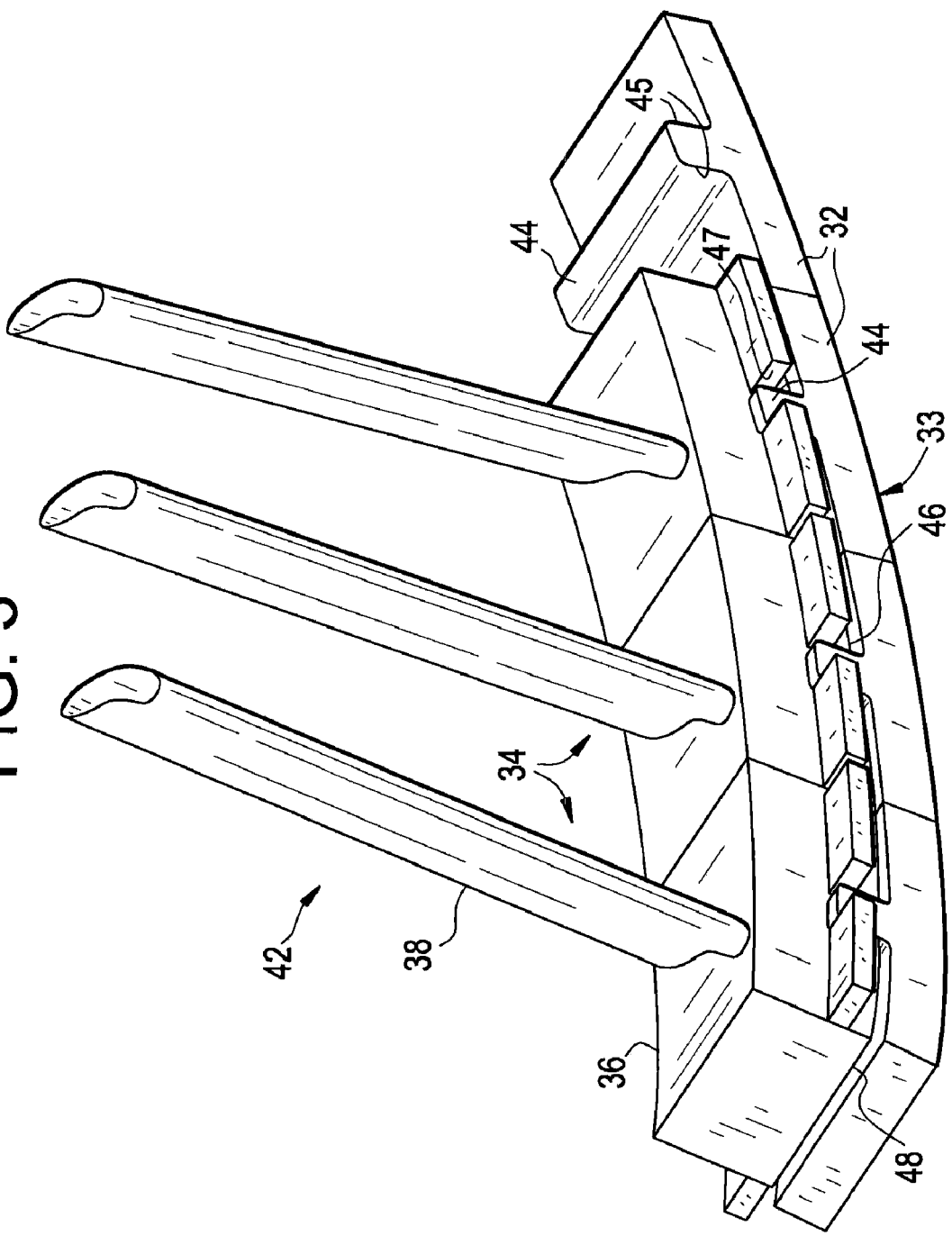
FIG. 3 is an isometric view of a portion of a nozzle assembly of the gas turbine engine compressor of FIG. 1.
Figure 4:
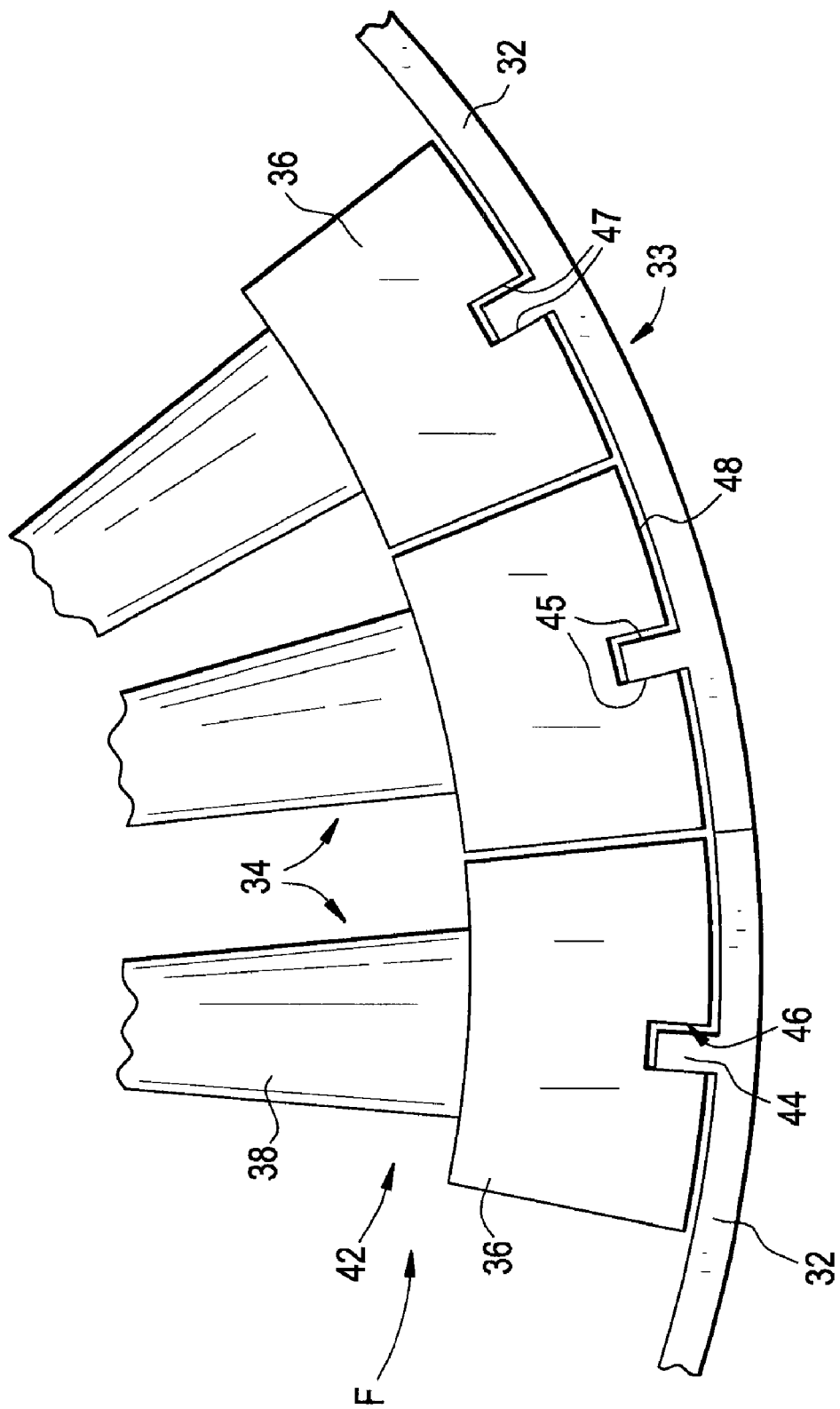
FIG. 4 is a view of a portion of another embodiment of the nozzle assembly of the gas turbine engine compressor of FIG. 3.

Referring in greater detail to FIG. 3, in one exemplary embodiment, each fin-ring segment 32 has a circumferential length that closely approximates the circumferential length of each base member 36 of the stator blades 34. A radially inwardly extending ridge or fin 44 extends axially across a portion of each fin-ring segment 32. The fin 44 includes sidewalls 45 and is configured to mate with a complementary base slot 46, having sidewalls 47 formed in the bottom surface 48 of the base member 36 of the stator blade 34. During operation of the multi-stage axial compressor 12, airflow over the airfoils 38 applies a circumferential force "F" on the stator blade 34. The circumferential force "F" is transferred from the sidewalls 47 of the complimentary base slot 46 of the base member 36 to the adjacent sidewalls 45 of the fin 44. As a result the fin-ring segment 32 and, ultimately, the fin-ring 33 will absorb the sum of the force "F" applied to each of the stator blades 34 instead of the force being transferred by contact between adjacent base members 36 of the stationary nozzle assembly 42. Each stator blade 34 in the nozzle assembly will experience relatively consistent, as opposed to an additive, force loading. In an alternative embodiment illustrated in FIG. 4, each fin-ring segment 32 may have a circumferential length that approximates the circumferential length of several adjacent base members 36 of the stator blades 34 thereby reducing the number of individual components that must be assembled into the circumferential casing 22.

Figure 5:
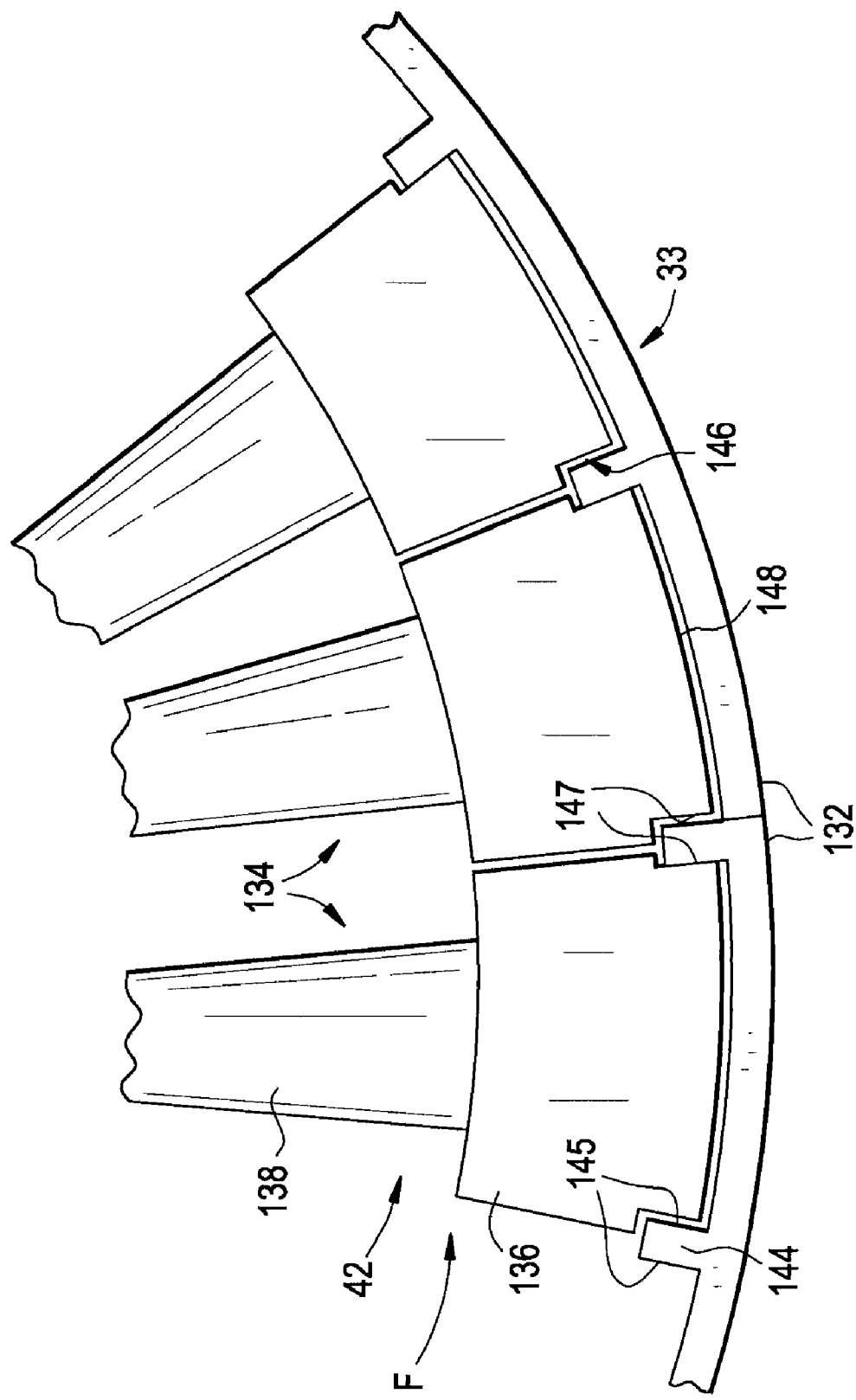
FIG. 5 is a view of a portion of another embodiment of the nozzle assembly of the gas turbine engine compressor of FIG. 1.

Referring to FIG. 5, where like numerals are used to illustrate like features already described, in another exemplary embodiment, radially inwardly extending ridges or fins 144 extend axially across the fin-ring segments 132. The fins 144 include sidewalls 145 and are configured to mate with complementary base notches 146, having sidewalls 147 formed in the bottom surface 148 at each end of the base member 136 of the stator blade 134. During operation of the multi-stage axial compressor 12, airflow over the airfoils 138 applies a circumferential force "F" on the stator blade 134. The circumferential force "F" is transferred from the sidewalls 147 of the complimentary base notches 146 of the base member 134 to the adjacent sidewalls 145 of the fins 144. As a result the fin-ring segment 132 and, ultimately, the fin-ring 33 will absorb the sum of the circumferential force "F" applied to each of the stator blades 134 instead of the force being transferred by contact between adjacent base members 136 of the stationary nozzle assembly 42. Each stator blade 134 in the nozzle assembly 42 will experience relatively consistent force loading.

While exemplary embodiments of the invention have been described to include fins extending axially across fin-ring segments, it is recognized that the configuration of the fins, while described as having a "rail-like" configuration, may include any one of a number of other suitable shapes and still fall within the scope of the invention herein described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine engine comprising:
   a circumferential casing having a circumferentially extending slot formed in an inner wall thereof;
   a radially inwardly facing fin-ring disposed in said slot and having a radially inwardly extending fin extending axially across said fin-ring, said fin having adjacent sidewalls;
   a radially inwardly extending stator blade having a base and an airfoil, said base disposed in said slot, radially inwardly of said fin-ring; and
   a complementary base slot disposed in said stator blade base and configured to receive said fin therein for transfer of a circumferential force, said complementary base slot having base sidewalls where said circumferential force is transferred from said base sidewalls to said adjacent sidewalls of said fin.

2. The turbine engine of claim 1, said radially inwardly facing fin-ring comprising a series of fin-ring segments.

3. The turbine engine of claim 1, said radially inwardly facing fin-ring comprising a series of circumferentially spaced apart radially inwardly extending fins configured to engage a series of stator blades to define a stationary nozzle assembly in said casing.

4. The turbine engine of claim 3, said series of stator blades of said nozzle assembly each having a consistent force loading.

5. The turbine engine of claim 1, said complementary base slot configured as a notch extending axially across said stator blade base at an end thereof.

6. A turbine engine comprising:
   a multistage axial compressor having a circumferential casing;
   a circumferentially extending slot formed in an inner wall of the casing;
   a radially inwardly facing fin-ring disposed in said slot and having a plurality of radially inwardly extending fins extending axially across said fin-ring in a spaced relationship, said fins each having adjacent sidewalls;
   a stationary nozzle assembly comprising a plurality of radially inwardly extending stator blades having an airfoil and a base with a base slot disposed therein, the stator blade bases disposed in said circumferentially extending slot with said base slots receiving radially inwardly extending fins of said fin-ring for the transfer of a circumferential force, said base slots each having base sidewalls where said circumferential force is transferred from said base sidewalls to said adjacent sidewalls of said fins.

7. The turbine engine of claim 6, said radially inwardly facing fin-ring comprising a series of fin-ring segments.

8. The turbine engine of claim 6, said series of stator blades of said nozzle assembly each having a consistent force loading.

9. The turbine engine of claim 6, said base slots configured as a notch extending axially across said stator blade bases at an end thereof.

10. A turbine engine comprising:
    a circumferential casing having a circumferentially extending slot formed in an inner wall thereof;
    a radially inwardly facing fin-ring disposed in said slot and having a radially inwardly extending fin extending axially across said fin-ring;

a radially inwardly extending stator blade having a base and an airfoil, said base disposed in said slot, radially inwardly of said fin-ring; and a complementary base slot disposed in said stator blade base and configured to receive said fin therein for transfer of a circumferential force, applied to said stator blade, to said fin-ring, and wherein said complementary base slot is configured to extend axially across said stator blade base between the ends thereof.

11. A turbine engine comprising:

a multistage axial compressor having a circumferential casing;

a circumferentially extending slot formed in an inner wall of the casing;

a radially inwardly facing fin-ring disposed in said slot and having a plurality of radially inwardly extending fins extending axially across said fin-ring in a spaced relationship;

a stationary nozzle assembly comprising a plurality of radially inwardly extending stator blades having an airfoil and a base with a base slot disposed therein, the stator blade bases disposed in said circumferentially extending slot with said base slots receiving radially inwardly extending fins of said fin-ring for the transfer of a circumferential force, applied to the stator blades, to said fin-ring, and wherein said base slots are configured to extend axially across said stator blade bases between the ends thereof.

\* \* \* \* \*